Figure 4:
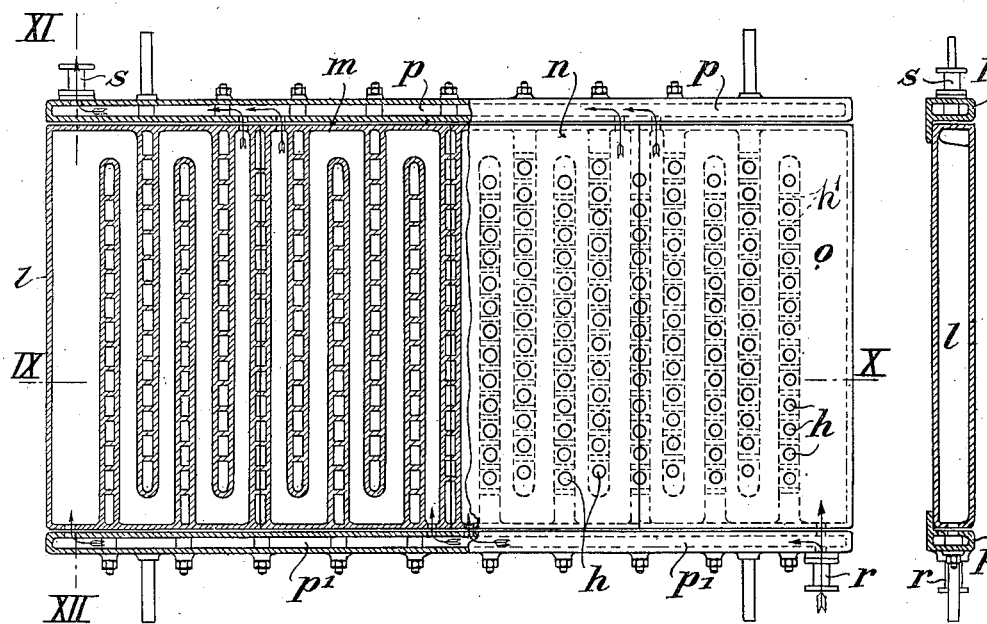

S. A. SCHEWCZIK.
HOT PLATE.
APPLICATION FILED JAN. 30, 1912.
1,094,256.
Patented Apr. 21, 1914.
2 SHEETS—SHEET 1.
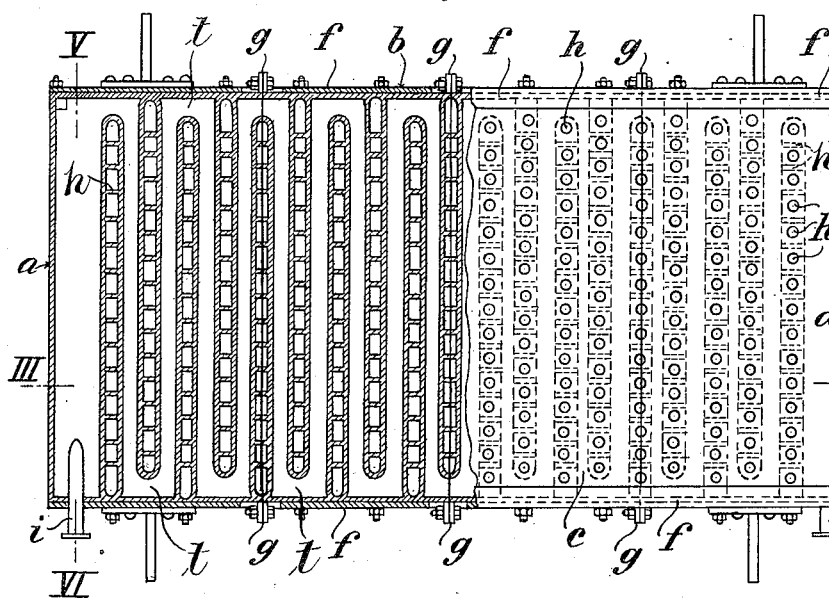
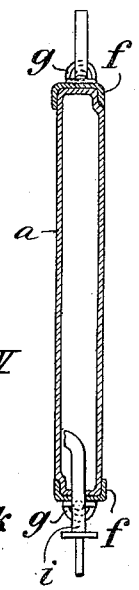
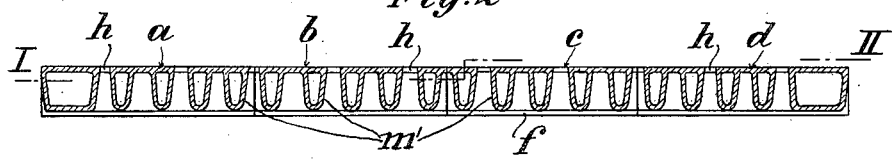

S. A. SCHEWCZIK.
HOT PLATE.
APPLICATION FILED JAN. 30, 1912.

1,094,256.

Patented Apr. 21, 1914.

2 SHEETS—SHEET 2.

Witnesses:
F. M. Meyer
Miriam Stern

Inventor:
S. A. Schewczik
per
his Attorney.

UNITED STATES PATENT OFFICE.

SILVIO ANTON SCHEWCZIK, OF VIENNA, AUSTRIA-HUNGARY.

HOT-PLATE.

1,094,256.  Specification of Letters Patent.  Patented Apr. 21, 1914.

Application filed January 30, 1912. Serial No. 674,843.

*To all whom it may concern:*

Be it known that I, SILVIO ANTON SCHEW-CZIK, subject of the King of Austria, residing at Vienna, Austria-Hungary, have invented certain new and useful Improvements in Hot-Plates, of which the following is a specification.

This invention relates to improvements to steam heated hot plates as used for drying fabrics and the like. It is well known that such hot plates are provided with a plurality of openings to enable circulation of air and in former constructions the provision of these openings has led to the objection that great care has to be taken during their manufacture so as to avoid leakages at the numerous joints. In consequence of this such heating plates have been exceedingly expensive, while after being in use for some time, leakages were bound to occur at the numerous joints.

The object of the present invention is to simplify and improve the entire construction and arrangements of such hot plates.

This invention consists in an arrangement of steam heated hot plate in which the usual steam box is provided, but is formed with a number of bowl shaped depressions. The hot plate has on its lower surface a trough-shaped channel arranged conveniently in zig-zagged form, this trough-shaped channel being cast in one with the plate itself and being arranged to follow a zig-zag path between rows of perforations which act as the air ducts. In this way the walls of the depressions on the surface of the hot plate also form the sides of the steam passages and special arrangements for guiding the steam are rendered unnecessary.

Another feature consists in that the walls of the depressions which may be joined by cross ribs for the purpose of increasing the heating surface are very efficiently served with steam and heated.

In order to enable the invention to be carried out easily in cast metal, the heating plate may consist of a number of complete elements of short length which may be arranged closely together by a suitable frame or border and interconnected so that the steam flows in series through all the elements or each element may be provided with a separate steam connection. When each element is provided with a separate steam connection, the frame or border may be formed hollow so as to serve the purpose of a steam supply connection to the various elements.

By means of this invention, the heating plate may be made of any desired length, which was impossible in previous constructions and this may be attained without forming the usual and objectionable openings in the drying surface. The invention also permits of greater range of control as the supply steam through each element may be regulated independently so as to obtain any desired intensity of heating effect, or the steam may be allowed to pass through any desired and greater number of elements so as to give a less intense heating or drying effect.

The invention is illustrated by way of example in two modifications in the accompanying drawings in which:—

Figure 6:
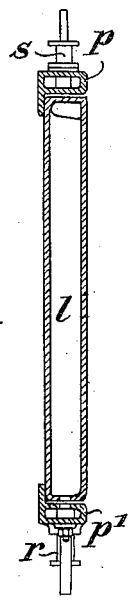
Figure 5:
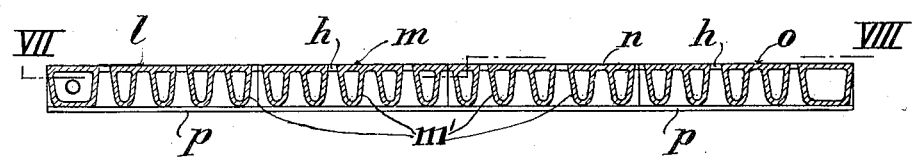

Figure 1 is a section on the line I—II of Fig. 2. Fig. 2, is a longitudinal section through the plate on the line III—IV of Fig. 1. Fig. 3, is a section on the line V—VI of Fig. 1. Fig. 4, also shows a hot plate partly in section and partly in plan on the line VII—VIII of Fig. 5. Fig. 5, is a section on the line IX—X of Fig. 4. Fig. 6, is a longitudinal section on the line XI—XII of Fig. 4.

In carrying the invention into effect according to the form shown in Fig. 1, the hot plate consists of four elements, $a$, $b$, $c$, and $d$, which are comparatively short and are arranged closely together. They are supported in a frame or border piece $f$, which is conveniently of U shape in cross section. In addition they may be provided with flanges $g$, at the points where they adjoin one another, these flanges being provided for the purpose of bolting the elements together. As seen in Fig. 2, the lower surface of the hot plate is formed of a number of gutter shaped channels or boxes arranged parallel to one another but not absolutely in contact. In this way the air circulating openings $h$, may be arranged in the web, forming the junction between adjacent legs $m'$ of the trough or gutter shaped steam passages. The air openings $h$, are thus completely outside the steam space and consequently no leakage can be caused by the introduction or multiplication of these air ducts. The air ducts may be arranged and distributed in any convenient manner and may be of any form. For instance, they may be tapered or parallel and their edges may be rounded in any convenient manner. As seen in Fig. 2, the openings $h$, are arranged with tapered sides forming substantially a continuation of the sloping sides of the steam ducts $a$. The side walls of the air ducts or the depressions on the lower surface of the plate form also the boundary walls for the steam space as will be understood from Fig. 2. In this way it is not necessary to provide special and separate ducts for the steam. Suitable means may be provided so as to give a more intensive heating action on the air passing through the holes $h$. This may be attained by forming each hole as the opening of a nozzle. Such a construction may easily be carried out by providing connecting ribs $h'$ between the side walls of adjacent steam troughs. These cross ribs $h'$ may, as shown in Fig. 1, be arranged between each pair of the holes $h$. The air passing up through the hot plate thus becomes heated, not only by the side walls of the steam troughs but also by the ribs $h'$ connecting the steam troughs. The steam is introduced to the troughs by an inlet pipe $i$, and thus passes in a zig-zag path through all the elements $a$, $b$, $c$ and $d$, till it finds its outlet at $k$.

According to the form shown in Figs. 4 to 6, the heating plate again consists of four elements or sections $l$, $m$, $n$, $o$ arranged adjacent to one another and connected by side frames $p$, $p'$. The side frames $p$, $p'$, are hollow and act as conduits for conducting the steam to and from the elements, each element thus receives its own supply of steam as the elements are arranged in parallel between the inlet header $p'$ and the outlet header or hollow frame $p$. The direction of flow of steam is shown by the arrows in Fig. 4. The inlet header $p'$ is supplied with steam or heating fluid by means of an inlet pipe $r$, and the outlet header $p$, has connected to it an outlet connection $s$. The steam troughs, depressions and the openings $h$, are arranged in this form in the same manner as the prior form described with reference to Figs. 1 to 3.

It will be seen that in both the forms described above the steam enters at an inlet connection ($i$, in Fig. 1, and the inlet box $p'$, in Fig. 4,) and passes in a zig-zag path from side to side and progressively along the length of the underside of the hot plate. This zig-zag passage is constituted by the trough shaped depressions which extend transversely of the plate and do not reach completely across the width of the plate. In both cases also it will be seen that adjacent transversely extending depressions start from opposite sides of the hot plate, and leave passages $m$, at alternate sides whereby the continuity of the zig-zag path is obtained. The steam after passing in the zig-zag manner described then enters the outlet connection which may be the pipe $k$, in Fig. 1, or the box $p$, in Fig. 4.

I claim:

1. In combination, a hot plate section having rows of perforations therein, zig-zag trough-shaped channels cast on the underside of and in one with said hot plate section and extending between said rows of perforations to form a continuous circuitous duct, a supply connection connected with the zig-zag duct, an outlet connection at the other end of said zig-zag duct, transverse ribs between parallel lengths of said zig-zag ducts and located between adjacent perforations on the hot plate.

2. A hot plate having a top, comprising a plurality of sections, means for securing the sections together, each section having a circuitous trough, the walls of which are spaced apart to form an air passage, the trough of each section matching with the trough of the adjacent section to form the trough continuous throughout the entire plate, the top having a plurality of openings which communicate with the air passage, said air passage having transverse braces located between adjacent openings, an inlet pipe communicating with the trough, and an outlet pipe communicating with the trough.

In testimony whereof I have signed my name to this specification in the presence of two subscribing witnesses.

SILVIO ANTON SCHEWCZIK.

Witnesses:
AUGUST FUGGER,
JOHANN HAINZL.

---

Copies of this patent may be obtained for five cents each, by addressing the "Commissioner of Patents, Washington, D. C."